3,017,281
FORMULATION FOR CASTING PIGMENTED FILM
Robert L. Lambert, Emporium, and William R. McKeirnan, Crosby, Pa., assignors to Sylvania Electric Products Inc., a corporation of Delaware
No Drawing. Filed June 19, 1959, Ser. No. 821,344
6 Claims. (Cl. 106—185)

This invention relates to suspensions suitable for casting film of an emissive material, which material is subsequently to be applied as a coating to a support structure, the coated surface forming a cathode to be associated with other electrodes and other parts to form an electron tube.

The suspension disclosed herein is an improvement over that disclosed in the copending application of Kerstetter and Wenin, now Patent 2,986,671, granted May 30, 1961. The suspension may be cast as described in the copending application of the inventors, now Patent 2,974,364, granted March 14, 1961.

It is an object of the invention to incorporate with a suspension of alkaline earth carbonates and a cellulosic binder a multiplicity of solvents for the binder to give better solubility of the mixture, to render it easier to duplicate the viscosity of the suspension by controlling the swelling of the cellulose and to give better control of the drying of a film cast from the suspension.

It is a further object of the invention to incorporate with the suspension a plasticizer of such character as will not deleteriously affect the emissivity of the carbonates when finally applied as a coating on a metal support base.

Yet another object of the invention is to incorporate with the suspension a density control additive for the purpose of insuring predicted porosity of the film cast from the suspension.

Still further, it is an object of the invention to incorporate with the suspension a medium which will have an oxidizing effect on the cellulosic binder during tube manufacture and which will also have the effect of effectively hindering peeling of the film from its metallic support when the film is subsequently applied to the support and processed thereon.

Also it is an object of the invention to incorporate with the suspension an agent to prevent too rapid infiltration into the binder of a release agent subsequently utilized to release, from the casting surface, a film deposited on the surface from the suspension.

Thus the suspension should contain the alkaline earth carbonates, a cellulosic binder therefor, a multiplicity of organic solvents for the binder, a plasticizer, a density control additive, a release agent penetration retarder, and an oxidizing agent for the cellulosic material which preferably should also have the property of attaining good adherence between the emissive coating formed from the film and the metallic base, usually nickel, to which the film is applied.

The emissive material is conventional and comprises preferably co-precipitated barium, strontium and calcium carbonates (triple carbonates), as well as co-precipitated barium and strontium carbonates (double carbonates) and/or mixed single carbonates, although only the triple carbonates are specifically mentioned in the formulations presented. The proportion of the triple carbonates, by weight, preferably should be 57% barium carbonate, 39% strontium carbonate and 4% calcium carbonate.

The cellulose binder for optimum results should be ethyl cellulose having an ethoxyl content of between 47.5 to 49.0% with a degree of substitution of ethoxyl group per anhydroglucose unit of between 2.42 and 2.53 and having a viscosity of 300 centipoises in a 5 percent solution of 80:20 toluene:ethanol and which predicated on the solid content of the suspension including the carbonates and the nitrate may be anywhere from 5% to 20% depending on the viscosity of the cellulose and the specific type of electron tube intended to be manufactured. That is to say it might be desirable to utilize a low porosity film for a rectifier of high current density while a more porous and less dense film might be required for a low current density type electron tube. In the formulation which follows and which gives a suitable suspension, the percentage is approximately 6.91.

The organic solvents should be a mixture with different evaporative temperatures first, to properly dissolve the ethyl cellulose; secondly, to render it easier to control the viscosity of the suspension and thus insure, when the mixture is dried out, a predicted uniform porosity of the film and therefore a predicted density thereof; and thirdly, by leaving the film in stages, to form a good strong film to be handled during stripping of the film after it had been cast. For best results a mixture of three solvents should be used with toluene, a non polar solvent, predominant; the other solvents preferably should be ethanol and ethyl acetate. As a substitute for ethanol the following may be used: methanol, propanol, isopropanol and butanol. As a substitute for ethyl acetate the following may be used: acetone, methyl acetate, propyl acetate, and amyl acetate.

The plasticizer should be of a temporary character, removed from the coating during the normal heat and evacuation processing of the tube and will vary according to the temporary plasticity desired in the film. A plasticizer which has a non-deleterious effect on the finally formed emissive film is butyl carbitol and this may be used in the example given below as ranging from 10 ml. to 50 ml.

The density control additive is utilized to produce voids in the film on evaporation of the solvents. Ethylene carbonate, a low melting solid soluble in alcohols and esters, is such a material. Densities of the film can be controlled and predicted within about 2 to 3 percent in the solvents set forth above by the incorporation of the ethylene carbonate within the suspension. It has been found that the scope and range of the ethylene carbonate is limited. If the total weight of ethylene carbonate and the co-precipitated carbonates exceeds the total weight of solvents by approximately 10%, the ethylene carbonate will be precipitated from the suspension and destroy the homogeneity of the suspension. The ethylene carbonate also acts to retard the adsorption into the cast film of the preferred release agent which is 2-(2-aminoethylamino) ethanol. The preferred amount is given in the example below.

The barium nitrate, which in its final form after heat processing of the tube secures good adhesion between the film and the nickel base, may vary from 1 to 10 percent by weight of the triple carbonates. The preferred percentage is given below.

In the formulation of a suspension, the solvents are measured and the ethyl carbonate is dissolved in them. Next the ethyl cellulose is added and stirred, as by an electric stirrer, until solution is effected. This preparation is then poured through a number 100 sieve to remove any solids that may not have been dissolved. The alkaline earth carbonates and barium nitrate are then added to the mixture and the mixture is further stirred. Finally, the resulting suspension is milled for about sixteen hours; then it is ready for casting.

A preferred suspension for casting a four inch wide film 0.002 inch thick and about 270 feet long having a density of about 0.85 gm./cm.$^3$ comprises the following.

| | | |
|---|---|---|
| Ethylene carbonate | gms | 200 |
| Toluene | ml | 400 |
| Ethanol | ml | 125 |
| Ethyl acetate | ml | 50 |
| Butyl carbitol | ml | 25 |

| | |
|---|---|
| Ethyl cellulose N-300 _____ gms__ | 30 |
| Barium nitrate _____ gms__ | 4 |
| Triple alkaline earth carbonates _____ gms__ | 400 |

The triple carbonates should be of the preferred percentages of barium, strontium and calcium carbonates as given above.

Having thus described the invention, what is claimed is:

1. A suspension for casting a film consisting essentially of a mixture of alkaline earth carbonates, an organic soluble ethyl celluose binder therefor, a mixture of solvents with different evaporative temperatures for the binder, said mixture being predominantly toluene, a temporary plasticizer in the form of butyl carbitol and a film density control additive in the form of ethylene carbonate, the total weight of the carbonates and density control additive not exceeding by more than, approximately, 10% the total weight of said solvents.

2. A suspension for casting a film consisting essentially of alkaline earth carbonates, a cellulose binder for the carbonates in the form of ethyl cellulose, an oxidizing agent in the form of barium nitrate, said barium nitrate varying from 1 to 10% by weight of the alkaline earth carbonates, organic solvents for the binder including a non-polar solvent, in the form of toluene, with the non-polar solvent predominant over the other solvents, a plasticizer in the form of butyl carbitol and a density control additive in the form of ethylene carbonate, such ethylene carbonate and alkaline earth carbonates having a total weight not exceeding by more than, approximately, 10% the total weight of the solvents.

3. A suspension for casting a film consisting essentially of a mixture of alkaline earth carbonates, an ethyl cellulose binder therefor in the proportion of 5% to 20% of the solid content of the suspension, solvents for the binder including a non-polar solvent, in the form of toluene, with the non-polar solvent predominant over the other solvents, a plasticizer in the form of butyl carbitol and a film density control additive in the form of ethylene carbonate, the total weight of all of said carbonates not exceeding by more than, approximately, 10% the total weight of said solvents.

4. A suspension for casting a film consisting essentially of alkaline earth carbonates, a cellulose binder for the carbonates in the form of ethyl cellulose, an oxidizing agent in the form of barium nitrate, said barium nitrate varying from 1 to 10% by weight of the alkaline earth carbonates, organic solvents for the binder including a non-polar solvent, in the form of toluene, with the non-polar solvent predominant over the other solvents, a plasticizer in the form of butyl carbitol and a density control additive in the form of ethylene carbonate, such ethylene carbonate and alkaline earth carbonates having a total weight not exceeding by more than, approximately, 10% the total weight of the solvents.

5. A suspension for casting a film consisting essentially of the following:

| | | |
|---|---|---|
| Ethylene carbonate | gm__ | 200 |
| Toluene | ml__ | 400 |
| Ethanol | ml__ | 125 |
| Ethyl acetate | ml__ | 50 |
| Butyl carbitol | ml__ | 10 to 50 |
| Ethyl cellulose | gms__ | 30 to 120 |
| Barium nitrate | gms__ | 4 to 40 |
| Triple alkaline earth carbonates | gm__ | 400 | said ethyl cellulose having an ethoxyl content of between 47.5 and 49.0% and a viscosity of 300 centipoises in a 5% solution of 80:20 toluene to ethanol.

6. A suspension for casting a film consisting essentially of the following:

| | | |
|---|---|---|
| Ethylene carbonate | gm__ | 200 |
| Toluene | ml__ | 400 |
| Ethanol | ml__ | 125 |
| Ethyl acetate | ml__ | 50 |
| Butyl Carbitol | ml__ | 25 |
| Ethyl cellulose | gm | 30 |
| Barium nitrate | gm__ | 4 |
| Triple alkaline earth carbonates | gm__ | 400 | said ethyl cellulose having an ethoxyl content of between 47.5 and 49.0% and a viscosity of 300 centipoises in a 5% solution of 80:20 toluene to ethanol.

References Cited in the file of this patent

UNITED STATES PATENTS

| | | |
|---|---|---|
| 1,809,095 | Wilson et al. | June 9, 1931 |
| 2,800,446 | Fredenburgh | July 23, 1957 |
| 2,895,854 | Rocque | July 21, 1959 |

FOREIGN PATENTS

| | | |
|---|---|---|
| 787,926 | Great Britain | Dec. 18, 1957 |